2,770,628
N-SUBSTITUTED PYRROLES AND PROCESS

Newman M. Bortnick, Oreland, and Marian F. Fegley, Mont Clare, Pa., assignors to Rohm & Haas Company, Philadelphia, Pa., a corporation of Delaware No Drawing. Application August 26, 1953,
Serial No. 376,742

9 Claims. (Cl. 260—309.7)

This invention deals with a process for preparing pyrroles having an N-substituent by reacting a primary amine and a bis(tert-amino)-1,3-butadiene. This invention also deals with N-substituted pyrroles which now become readily available for the first time.

Interest in pyrrole has been great since it is an essential unit in such important substances as chlorophyll and hemoglobin. Yet lack of a good synthesis for substituted pyrroles has prevented extended study in this field. The present invention provides a good general method for making a great variety of pyrroles. Since these are highly reactive substances, they are valuable blocks for reaching a large number of novel compounds. The substituted pyrroles are also useful in the pharmaceutical field, providing hypnotics, analgesics, local anesthetics, bactericides, fungicides, and the like.

According to this invention bis(tert-amino)-1,3-butadienes are reacted with primary amines having ionization constants of at least $4.6 \times 10^{-10}$ and preferably of $10^{-7}$ or more. The reaction is effected in the presence of hydrogen ions. These can be supplied with the less basic amines from the carbon dioxide of the air. With more basic amines more strongly acidic substances are apparently necessary. It may, therefore, be correctly said that the reaction is effected in the presence of an acidic catalyst.

As catalysts, there may be used the greatest variety of substances which provide hydrogen ions from organic acids through acidic salts to strong inorganic acids. Usually it is best to work with an acid at least as strong as propionic or acetic acid. There may be used formic, phosphoric, polyphosphoric, arylsulfonic, such as p-toluenesulfonic, alkanesulfonic, sulfuric, hydrobromic, hydrochloric, or other acids of comparable strength. A particularly convenient catalyst is a mixture of propionic or acetic acid and hydrochloric acid. Another useful group of catalysts comprises complexes of boron trifluoride and oxygenated compounds, such as the coordination complexes of boron trifluoride with ethyl ether or butyl ether, or with a carboxylic acid, such as $BF_3 \cdot 2CH_3COOH$, or with carboxylic esters, such as $BF_3 \cdot 2CH_3COOC_2H_5$, or with ketones, such as $BF_3 \cdot CH_3COCH_3$, or with alcohols, such as $BF_3 \cdot 2C_4H_9OH$. Also effective are acid salts and Friedel-Crafts catalysts such as aluminum chloride, zinc chloride, ferric chloride, and the like.

With the relatively more acidic catalysts the reaction runs at relatively lower temperatures. Thus, with hydrochloric or hydrobromic acid as catalyst, reaction with many amines is promoted at 20° to 30° C. Higher temperatures may, however, be used and are sometimes advantageous, particularly to help in the separation of amines. In many cases reaction begins even below 20° C. and in some cases temperatures may be carried up to 150° C. or more, although by-products may be also formed at high temperatures. A range of 20° to 100° C. is generally preferred.

The reaction may be effected by mixing the two reactants directly and usually adding an acidic catalyst. Excess amine may serve as solvent or an inert organic solvent may be used, such as an alcohol, ether, or hydrocarbon, including methanol, ethanol, isopropanol, butanol, ethyl ether, isopropyl ether, dioxane, benzene, toluene, or naphtha.

The bis(tert-amino)-1,3-butadienes which are used may be summarized by the formula

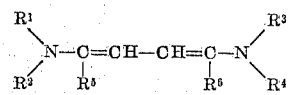

wherein $R^1$ and $R^2$ represent individually aliphatic hydrocarbon groups of not over four carbon atoms each or the benzyl group and when taken together, saturated divalent aliphatic chains which together with the amino nitrogen form a heterocycle, such as is found in pyrrolidine, piperidine, methylpiperidine, morpholine, thiamorpholine, dimethylmorpholine, or N-methylpiperazine, $R^3$ and $R^4$ represent the same groups and chains, but need not be identical with $R^1$ and $R^2$, and $R^5$ and $R^6$ are hydrogen, alkyl groups of not over eight carbon atoms, or phenyl groups. Other groups which may appear as $R^5$ and $R^6$ are alkenyl, cycloalkyl, and substituted groups derived from substituted aldehydes. It is preferred that $R^1$ and $R^2$ together and likewise $R^3$ and $R^4$ together have a group weight of not over 120.

While any of these bis(tert-amino)-1,3-butadienes can be used as reactants, the most economical starting materials are 1,4-bis(dimethylamino)-1,3-butadiene and 1,4-bis(diethylamino)-1,3-butadiene. These are available through the thermal isomerization of 1,4-bis(dimethylamino) - 2 - butyne or 1,4 - bis(diethylamino) - 2 - butyne. These and other bis(tert-amino) - 1,3 - butadienes are available through the isomerization of corresponding butynes under the influence of lithium, sodium, or sodium hydrocarbons as catalysts at temperatures preferably from 20° to 150° C. This novel process is described in detail in our application Serial No. 316,558, filed October 23, 1952. There may thus be prepared 1,4 - bis(dimethylamino) - 1,4 - dioctyl - 1,3 - butadiene, 1,4 - bis(dibutylamino)-1,3-butadiene, 1,4-bis(dipropylamino)-1,3-butadiene, 1,4-bis(diethylamino) - 1 - (2,4,4-trimethylpentyl)-1,3-butadiene, 1,4-bis(dimethylamino)-1-phenyl-1,3-butadiene, 1,4-bis(dimethylamino)-1-isopropyl-1,3 - butadiene, 1,4 - bis(dimethylamino) - 1,4 - diisopropyl - 1,3 - butadiene, 1,4 - bis(dimethylamino) - 1 - methyl - 1,3 - butadiene, 1,4 - bismorpholino - 1,3 - butadiene, 1,4 - bispyrrolidino - 1,3 - butadiene, 1,4 - bispiperidino - 1,3 - butadiene, 1,4 - bis(3,5 - dimethylmorpholino) - 1,3 - butadiene, 1,4 - bis(N-methylpiperazino) - 1,3 - butadiene, 1,4 - bismorpholino - 1,4 - diphenyl - 1,3 - butadiene, 1,4-bismorpholino - 1,4 - diisopropyl - 1,3 - butadiene, 1,4-bismorpholino - 1 - octyl - 1,3 - butadiene, 1 - morpholino - 4 - dimethylamino - 1,3 - butadiene, 1 - morpholino - 1-methyl - 4 - dimethylamino - 1,3 - butadiene, 1,4 - dithiamorpholino-1,3-butadiene, etc.

As primary amines, there may be used any primary amine having a fair degree of basicity. Aniline is about as weakly basic an amine as can be used and gives only a very modest yield of the desired N-phenylpyrrole. As basicity increases, ease of reaction to pyrroles seems to increase in general, although conversions and yields depend upon the particular amine as well as upon the selected bis(tert-amino)-1,3-butadiene. For example, with 1,4-bis(dimethylamino)-1,3-butadiene as the selected reactant and under arbitrarily fixed conditions of temperature, time, and catalyst, conversions to N-substituted pyrroles were obtained as follows: with n-butylamine, 64%; with tert-butylamine, 16%; with tert-octylamine, 66%; with 3,5,5-trimethylhexylamine, 67%; with n-octadecyl amine, 47%; with allylamine, 67%; with cyclohexylamine, 70%; with hydroxyethylamine, 38%; with 1-(β-aminoethyl)-2-imidazolidone, 50%; with benzylamine, 43%; with 1-(3-aminopropyl)-2-hexahydropyrimidone, 36%; and so on. It is clear from the large number of amines which have been examined that the primary amine may be an alkylamine from methyl to octadecyl or an alkenyl from allyl through oleyl, an alicyclic amine, such as cyclohexylamine, methylcyclohexylamine, cyclopentylamine, methylcyclopentylamine, an aralkylamine, such as benzylamine, methylbenzylamine, butylbenzylamine, aniline, or amines of polycyclic compounds such as 5-amino-3a,4,5,6,7,7a-hexahydro-4,7-methanoindene and 2-amino-1,7,7-trimethyl-bicyclo(2,2,1)-heptane (isobornylamine). The amines thus far may be summarized by the simple formula RNH2, where R is a hydrocarbon group, whether aliphatic, cycloaliphatic, arylaliphatic, or aryl, provided the amine is at least as basic as aniline.

It will be evident from the above general considerations that R is not, however, confined to hydrocarbon groups. The simple amines may be substituted with any type of group which does not bring the amine below the required level of basicity. Thus, there may be used hydroxyethylamine, 2-hydroxypropylamine, 3-hydroxypropylamine, the various hydroxybutylamines, and so on; ethoxyethylamine, butoxyethylamine, octoxyethylamine, methoxypropylamine, butoxypropylamine, decyloxypropylamine, hexadecoxypropylamine, ethoxyethoxypropylamine, octoxyethoxypropylamine, dodecoxy(polyethoxy)-propylamine, phenoxypropylamine, butylphenoxypropylamine, benzyloxypropylamine, dimethylaminoethylamine, dimethylaminopropylamine, diethylaminopropylamine, dibutylaminopropylamine, morpholinopropylamine, pyrrolidinopropylamine, piperidinopropylamine, 3 - (N-methylpiperazino)propylamine, vinyloxyethylamine, vinyloxybutylamines, hydroxyethylaminoethylamine, hydroxypropylaminoethylamine, hydroxypropylaminopropylamine, ethylenediamine, 1,2-propanediamine, 1,3-propanediamine, 1,4-butanediamine, 1,6-hexanediamine, diethylenetriamine, triethylenetetramine, etc.

The poly primary amines can be reacted step-wise so that, for example, a 2-aminoethylamino group can be introduced from ethylenediamine, or an ethane bispyrrole can be formed. On the other hand with polyamines containing one or more secondary or tertiary amino groups along with one or more primary amino groups only the primary amino groups react and thus basic substituents can be introduced into pyrroles.

The amines of the structure A=N(CH2)xNH2, where X is 2 or 3 and A represents two alkyl groups or a divalent chain, are of considerable interest as they lead to pyrroles having N-aminoalkyl groups which are basic and which give pharmaceutically important products. When A is a heterocycle-forming group, as the

—CH2CH2OCH2CH2— of morpholine or the —(CH2)4–5—of pyrrolidine or piperidine, the products are new and of particular therapeutic value. A, as noted, may be two alkyl groups, such as dimethyl, diethyl, or dibutyl. These starting materials also introduce basic tertiary nitrogen into the new pyrroles. The tertiary amine groups are convertible to quaternary ammonium groups by reaction with alkylating agents or the like, such as benzyl chloride or dodecylbenzyl chloride or bromide.

When N-aminoalkyl hexahydropyrimidones or imidazolidones are used, the resulting N-substituted pyrroles are of interest not only in the pharmaceutical field but also in the resin field, for the =NH group of the reaction product provides a point at which a methylol group can be introduced to tie the modified pyrrole into the resin. The above primary amines may be summarized by the formula

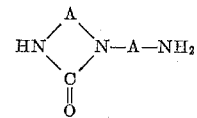

wherein A is an alkylene group of two to three carbon atoms. Thus, A may be ethylene,1,2-propylene, or trimethylene.

As has been shown a bis(tert-amino)-1,3-butadiene and a primary amine are mixed. A small amount of an acidic catalyst is added. This reaction mixture is stirred and usually heated. If the amine groups from the butadiene provide volatile amines, they may be taken off under normal or reduced pressure. Absorption of amine permits an estimate of the progress of the reaction. When the reaction appears fairly complete or the reaction becomes slow, the acidic catalyst is destroyed, as by addition of an alkaline reagent, such as sodium or potassium hydroxide or carbonate. The N-substituted pyrrole formed may then be isolated. Usually the pyrrole is distillable. It may also be isolated by precipitating it by adding water to the reaction mixture in some cases or an aqueous dilute acid, in which the pyrrole is insoluble. Yields may be somewhat reduced by this method as some of the pyrroles are sensitive to acid, especially at elevated temperatures.

Further details of typical preparations of N-substituted pyrroles are given in the illustrative examples, in which parts are by weight.

*Example 1*

There were charged to a reaction vessel equipped with stirrer, thermometer, gas inlet, and gas outlet which was connected to a scrubber containing dilute hydrochloric acid, 75 parts of cyclohexylamine, 75 parts of 1,4-bis-(dimethylamino)-1,3-butadiene, 0.3 part of glacial acetic acid and 0.1 part of concentrated hydrochloric acid. The charge was stirred, blanketed with nitrogen, and heated at 65°–75° C. for four hours. At this time the amount of dimethylamine absorbed in the scrubber was about 94% of theoretical. The reaction mixture was treated with potassium carbonate and subjected to fractional distillation. The main product fraction was taken at 62°–63° C./1 mm. The total conversion was over 70% to N-cyclohexyl pyrrole. The product contained by analysis 9.4% of nitrogen (theory 9.38%).

Repetition of this procedure with use of phosphoric acid leads to the same end products.

*Example 2*

There were charged to the reaction vessel 75 parts of n-butylamine, 46 parts of 1,4-bis(dimethylamino)-1,3-butadiene, 0.25 part of acetic acid and 0.15 part of hydrochloric acid. Nitrogen was passed through the stirred mixture, which was heated at 45° to 90° C. for four hours, by which time the theoretical amount of dimethylamine had been absorbed in the scrubber. The product was distilled as a main fraction at 67° C./15 mm. in an amount of 26 parts. It had a refractive index, $N_D^{20}$, of 1.4729 and contained 11.2% of nitrogen, corresponding in composition to N-butyl pyrrole, for which the theoretical nitrogen content is 11.37%.

*Example 3*

The reaction vessel was charged with 219 parts of aqueous methylamine, 80 parts of 1,4-bis(dimethylamino)-1,3-butadiene, 0.5 part of glacial acetic acid, and 0.3 part of concentrated hydrochloric acid. The mixture was slowly heated to 44° C. In a short time the mixture became homogeneous. After about an hour at 44° C. the reaction mixture was set aside for 16 hours. It was then chilled in an ice bath and acidified with aqueous 18% hydrochloric acid. An oil separated. The aqueous layer was removed and extracted with ether. The combined oil and ether extracts were dried over potassium carbonate and distilled to give a main fraction coming over at 114° C. It had a refractive index, $N_D^{23.5}$, of 1.4855 and corresponded in composition to N-methyl pyrrole. The conversion was over 46%.

*Example 4*

There were mixed 72 parts of tert-butylamine, 70 parts of 1,4-bis(dimethylamino)-1,3-butadiene, and 0.1 part of hydrochloric acid. The mixture was stirred at about 30° C. for six hours and heated at 45° C. for 3.5 hours. The reaction was treated with an excess of solid potassium hydroxide and fractionally distilled. The main fraction was taken at 74°–79° C./42 mm. It had a refractive index, $N_D^{20}$, of 1.4722 and contained by analysis 10.9% of nitrogen. It was N-tert-butyl pyrrole.

*Example 5*

There were mixed 30 parts of tert-octylamine, $$(CH_3)_3CCH_2C(CH_3)_2NH_2$$

15 parts of 1,4-bis(dimethylamino)-1,3-butadiene, 0.1 part of hydrochloric acid, and 0.2 part of acetic acid. This mixture was stirred and heated to about 50° C. for three hours and to 90° C. for a half hour. The reaction mixture was washed with four parts of an aqueous 25% potassium hydroxide solution and distilled. The main fraction was collected at 45°–53° C./0.55 mm. It amounted to 12 parts, a conversion of 66%. On redistillation this product boiled sharply at 58°–59° C./1.5 mm. It had a refractive index, $N_D^{20}$, of 1.4791 and contained 7.8% of nitrogen (theory 7.81%), corresponding in composition to N-tert-octyl pyrrole.

Repetition of the above procedure with use of sulfuric acid as catalyst gave the same end product. Likewise, substitution of 1,4-bis(diethylamino)-1,3-butadiene or 1,4-bis(dibutylamino)-1,3-butadiene leads to the identical product.

*Example 6*

There were mixed 31 parts of a branch-chained nonylamine (the nonyl group being obtained from propylene trimer), 14 parts of 1,4-bis(dimethylamino)-1,3-butadiene, 0.15 part of acetic acid, and 0.15 part of hydrochloric acid. The mixture was heated in an oil bath for three hours at 50°–70° C. and at 80°–90° C. for an hour. Four tenths part of potassium hydroxide was added. The mixture was distilled. The fraction containing the desired product, N-nonyl pyrrole, was collected at 52°–62° C./0.5 mm. and amounted to 16 parts. This material contained 7.4% of nitrogen (theory 7.24%). The main fraction was redistilled at 93°–94° C./4.3 mm. to give a pure product having a refractive index, $N_D^{20}$, of 1.4686. The conversion was 67%.

Repetition of this procedure with use of 1,4-bis(morpholino)-1,3-butadiene likewise gives N-nonyl pyrrole.

*Example 7*

There were mixed 56 parts of n-octadecylamine, 16 parts of 1,4-bis(dimethylamino)-1,3-butadiene, 0.1 part of hydrochloric acid, and 0.2 part of propionic acid. The mixture was stirred and heated to 60°–80° C. for three hours. The reaction mixture was filtered and the filtrate was distilled. The main fraction was collected at 178°–182° C./1 mm. to give 17 parts of N-n-octadecyl pyrrole. It contained by analysis 4.5% of nitrogen (theory 4.4%). This product is a waxy solid at room temperature. The conversion was 47%.

*Example 8*

There were mixed 30 parts of allylamine, 35 parts of 1,4-bis(dimethylamino)-1,3-butadiene, 0.1 part of hydrochloric acid, and 0.3 part of acetic acid. The mixture was stirred for an hour at 30° C. and then heated at 80° C. for four hours. The theoretical amount of dimethylamine had been collected in the scrubber at that time. Addition was made of 0.5 part of sodium carbonate. The mixture was distilled, 18 parts of N-allyl pyrrole being obtained at 61°–63° C./36 mm. This fraction contained by analysis 12.9% of nitrogen (theory 13.07%). It had a refractive index, $N_D^{23}$, of 1.4933.

Other alkenylamines may be used in the place of allylamine. In each case the corresponding N-alkenyl pyrrole is formed.

*Example 9*

There were mixed 31 parts of ethanolamine, 42 parts of 1,4-bis(dimethylamino)-1,3-butadiene, 0.1 part of hydrochloric acid and 0.3 part of acetic acid. The mixture was stirred and slowly heated to 65° C. where it was held for four hours. About 0.5 part of sodium hydroxide was added. The reaction mixture was distilled, the main fraction being collected at 48°–60° C./1 mm. in an amount of 25 parts (a 76% conversion). This was redistilled at 210°–215° C./760 mm. It contained by analysis 12.65% of nitrogen and had a hydroxyl number of 518 compared with theoretical values of 12.6% and 505 respectively, thus corresponding in composition to N-β-hydroxyethyl pyrrole. It had a refractive index of 1.5166 at 19° C.

*Example 10*

There were mixed 90 parts of N-(β-hydroxyethyl)-ethylenediamine, 74 parts of 1,4-bis(dimethylamino)-1,3-butadiene, 0.2 part of hydrochloric acid, and 0.4 part of acetic acid. The mixture was stirred and heated at 50° C. for 14 hours. There was added about one part of potassium carbonate. The mixture was distilled, the main fraction being collected at 109°–113° C./65 mm. It corresponded in composition to N-(β-hydroxyethylaminoethyl)-pyrrole, containing by analysis 18.4% of nitrogen (theory 18.2%) and having a refractive index, $N_D^{20}$, of 1.5218. This preparation is illustrative of the reaction of hydroxyalkylaminoalkylamines with the bisaminobutadienes. It can be similarly accomplished with N-(2-hydroxypropyl)-ethylenediamine, N-(2-hydroxypropyl)-propylenediamine, N-(2-hydroxyethyl)trimethylenediamine, N-(2-hydroxypropyl)trimethylenediamine, and so on.

*Example 11*

There were mixed 50 parts of β-aminoethyl vinyl ether, 34 parts of 1,4-bis(dimethylamino)-1,3-butadiene, 0.1 part of hydrochloric acid, and 0.3 part of acetic acid. This mixture was stirred and heated at 55°–65° C. for 4.5 hours. It was then washed with water, dried over anhydrous potassium carbonate, and fractionally distilled. The main fraction was collected at 45°–52° C./0.7 mm. It contained by analysis 10.4% of nitrogen and corresponded in composition to N-(β-vinoxyethyl)pyrrole, the theoretical nitrogen content of which is 10.2%. It was redistilled at 100° C. at 20.5 mm. and had a refractive index, $N_D^{20}$, of 1.5000. The yield was 48%.

This compound is one of particular interest because it can enter into copolymers and can form polymeric material under the influence of azo free radical catalysts. In place of β-aminoethyl vinyl ether there may be used other aminoalkyl vinyl ethers, such as 2-aminoisobutyl vinyl ether, 2-aminopropyl vinyl ether, or 3-aminopropyl vinyl ether. Thus the aminoalkyl group may desirably have two to four carbon atoms. In each case the product is an N-(vinoxyalkyl)pyrrole.

*Example 12*

There were mixed as above 47 parts of a 3-morpholinopropylamine, 60 parts of 1,4-bis(dimethylamino)-1,3-butadiene, 0.1 part of hydrochloric acid, and 0.2 part of acetic acid. The mixture was stirred and heated at 50°–55° C. for seven hours. About 0.5 part of solid potassium hydroxide was added. The mixture was distilled, the main fraction being obtained at 95°–100° C./1 mm. This product corresponds in composition to N-(3-morpholinopropyl) pyrrole.

Morpholinopropylamine may be replaced with the analogous amines of the formula $A{=}N(CH_2)_xNH_2$ with the reaction yielding analogous N-substituted pyrroles. Thus, pyrrolidinopropylamine yields N-(3-pyrrolidinopropyl) pyrrole, distilling at 68° C./0.5–2 mm., while piperidinopropylamine yields N-(3-piperidinopropylpyrrole, distilling at 83° C./0.5–2 mm.

In the same way there may be reacted morpholinoethylamine, pyrrolidinoethylamine, or piperidinoethylamine to give the ethyl homologues of the above compounds. These are very similar in their properties to the propyl homologues. There may likewise be made the butyl derivatives where X in the above formula has a value of four.

*Example 13*

There were mixed 30 parts of N-β-aminoethyl-2-imidazolidone, 20 parts of 1,4-bis(dimethylamino)-1,3-butadiene, 0.1 part of hydrobromic acid, and 0.3 part of acetic acid. The mixture was stirred and heated at 60° C. for 0.5 hour, washed with water, and salted out with potassium carbonate. The reaction product was distilled at 174°–175° C./1.4 mm. in an amount of 9.5 parts of N-imidazolidonylethyl pyrrole. This was redistilled at 195°–198° C./4 mm. and then crystallized from petroleum ether. The solid product melted at 114°–115.5° C. It contained by analysis 23.52% of nitrogen (theory 23.45%). This compound is an autonomic stimulant.

*Example 14*

There were mixed 54 parts of 1-(3-aminopropyl)2-hexahydropyrimidone, 37 parts of 1,4-bis(dimethylamino)-1,3-butadiene, 0.3 part of hydrochloric acid, and 0.5 part of acetic acid. The mixture was stirred and heated at 50° C. for three hours. It was washed with 20 parts of water, dried over potassium carbonate, and distilled. The main fraction was collected at 230°–236° C./0.5 mm. It corresponded in composition to N-hexahydropyrimidonylpropyl pyrrole. This compound is also useful in the pharmaceutical field, acting on the autonomic nervous system.

*Example 15*

There were mixed 14 parts of 1,4-bis(dimethylamino)-1,3-butadiene, and 9.3 parts of aniline, and 0.1 part of acetic acid. This mixture became solid. It was found that this material was a 1:1 adduct of the two materials, corresponding in composition to 1-phenyl-2,5-bis(dimethylamino) pyrrolidine. This adduct was distilled. Dimethylamine was evolved, also some aniline. A fraction was obtained at 220°–225° C. which was N-phenyl pyrrole.

There were also mixed 48 parts of aniline, 30 parts of 1,4-bis(dimethylamino)-1,3-butadiene, 0.1 part of hydrochloric acid, and 0.2 part of acetic acid. This mixture was stirred and heated at 55° C. for four hours. Potassium carbonate was added and the reaction mixture was distilled. At 82°–84° C./3 mm. a fraction was obtained which was chiefly N-phenyl pyrrole. This fraction was redistilled. The distillate now became solid, melting 58°–59° C. This product corresponded in composition to pure N-phenyl pyrrole.

*Example 16*

There were mixed 107 parts of benzylamine, 84 parts of 1,4-bis(dimethylamino)-1,3-butadiene, 0.2 part of hydrochloric acid, and 0.3 part of acetic acid. The mixture was stirred and heated at 70° C. for two hours. The product was distilled at 67°–68° C./0.35 mm. It had a refractive index, $N_D^{24}$, of 1.5655. It corresponded in composition to N-benzyl pyrrole.

*Example 17*

There were mixed 33 parts of ethylenediamine monohydrate, 58 parts of 1,4-bis(dimethylamino)-1,3-butadiene, 0.2 part of hydrochloric, and 0.35 part of acetic acid. The mixture was stirred at 50°–60° C. for 3.5 hours. The mixture was filtered to separate the solid which had formed. This solid was recrystallized from ethyl ether. It melted at 107° C.–108° C. and contained by analysis 17.43% of nitrogen, corresponding in composition to 1,2-dipyrrylethane, which theoretically contains 17.49% of nitrogen. Additional product was obtained by adding 70 parts of water to the filtrate.

*Example 18*

There were mixed 39 parts of ethylenediamine, 70 parts of 1,4-bis(dimethylamino)-1,3-butadiene, 0.1 part of hydrochloric acid, and 0.2 part of acetic acid. The mixture was stirred and heated at 60° C. for four hours. The reaction mixture was cooled and filtered. The solid product was recrystallized from ethyl ether, melting at 107°–108° C. It was identified as 1,2-dipyrrylethane. The filtrate was distilled to give a fraction boiling at 50°–53° C./1 mm. This corresponded in composition to N-(2-aminoethyl) pyrrole. It contained by analysis 24.8% of nitrogen (theory 25.4%).

It is thus possible to prepare mono- and di-substitution products of alkylenediamines. The diamines may contain two or more carbon atoms in the alkylene chain. Thus there may be used 1,2-diaminopropane, 1,3-diaminopropane, the various diaminobutanes, diaminohexanes, diaminooctanes, or diaminodecanes, and the like.

*Example 19*

The reaction vessel was charged with 47 parts of hexamethylenediamine, 50 parts of 1,4-bis-(dimethylamino)-1,3-butadiene, 0.1 part of hydrochloric acid, and 0.25 part of acetic acid. This mixture was heated at 80° C. for 1.7 hours. After addition of 0.3 part of potassium carbonate the material was fractionally distilled to give a cut which came over at 91°–120° C./1.3 mm. This was found to contain 16.87% nitrogen and corresponds to N-(6-aminohexyl) pyrrole. The theoretical nitrogen content of this material is 16.85%. The product has a refractive index, $N_D^{20}$, of 1.4920.

*Example 20*

A mixture of 30 parts of benzylamine, 16 parts of 1,4-dimorpholino-1,3-butadiene, 0.1 part of hydrochloric acid and 0.2 part of acetic acid was stirred and heated at 65° C. for 1.5 hours. The reaction mixture was treated with 50 parts of water and acidified with hydrochloric acid whereupon two layers formed. The organic layer was separated, dried over anhydrous potassium carbonate, and fractionally distilled. The main fraction distilled at 71°–73° C./1 mm. This was again washed with dilute hydrochloric acid to remove the remaining traces of free amine, dried over anhydrous potassium carbonate and distilled to give a fraction boiling at 77° C./0.6 mm. which corresponds in composition to N-benzylpyrrole.

*Example 21*

A stirred mixture of 10 parts of 1,4-di(2,4,4-trimethylpentyl)-1,4-bis(dimethylamino)-1,3-butadiene, 4 parts of n-butyl amine, 0.02 part of hydrochloric acid and 0.04 part of acetic acid was maintained at 50°–60° C. for three hours. The resulting reaction mixture was washed with dilute hydrochloric acid. Layers were allowed to separate. The organic layer was taken off and dried on potassium carbonate. It was then fractionally distilled; the fraction taken at 150°–156° C./0.1 mm. was identified as 1-butyl-2,5-bis(2,4,4-trimethylpentyl) pyrrole. The fraction as obtained contained by analysis 4.39% of nitrogen (theory 4.039%).

*Example 22*

There were mixed 14.5 parts of 1,4-diphenyl-1,4-bis-(dimethylamino)-1,3-butadiene and 10 parts of benzylamine. To this mixture there were added 0.2 part of acetic acid and 1.5 parts of concentrated hydrochloric acid. The resulting mixture was stirred at 60°–70° C. for 1.5 hours. It was then treated with potassium carbonate. Ether was added to the reaction mixture and the ether solution was filtered. From this solution there was obtained a solid product. This was recrystallized from a mixture of dioxane and pentane. The recrystallized solid melted at 144°–144.5° C. Upon analysis, it was found to contain 89.15% of carbon, 6.16% of hydrogen, and 5.46% of nitrogen, thus corresponding to 1-benzyl-2,5-diphenyl pyrrole for which the theoretical analyses are carbon, 89.28%; hydrogen, 6.19%; and nitrogen, 5.43%.

In the same way 1,4-diphenyl-1,4-bis(dimethylamino)-1,3-butadiene reacts with n-butylamine to form 1-butyl-2,5-diphenyl pyrrole, while 1-octyl-1,4-bis(dimethylamino)-1,3-butadiene yields 1-butyl-2-octyl pyrrole and 1 - phenyl - 4-isopropyl-1,4-bis(dimethylamino)-1,3-butadiene yields 1-butyl-2-isopropyl-5-phenyl pyrrole. The method of this invention thus provides pyrroles having substituents, particularly hydrocarbon substituents such as methyl, propyl, octyl, undecyl, 1-propenyl, isopropenyl, phenyl, substituted phenyl, cyclohexyl, etc., in the 2-and/or 5-positions.

We claim:

1. A process for preparing N-substituted pyrroles which comprises reacting together between about 20° and 150° C. in liquid phase under the influence of an acidic catalyst giving in water at least the acidity of propionic acid a primary amine having an ionization constant of at least $4.6 \times 10^{-10}$ and a bis(tert-amino)-1,3-butadiene of the structure

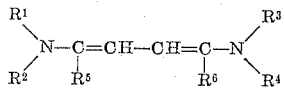

wherein $R^1$ and $R^2$ represent members of the class consisting of aliphatic hydrocarbon groups of not over four carbon atoms each and the benzyl group when taken individually and when taken together saturated divalent aliphatic chains which together with the nitrogen atom form a five- to six-sided heterocycle, $R^3$ and $R^4$ represent members of the class consisting of aliphatic hydrocarbon groups of not over four carbon atoms each and the benzyl group when taken individually and when taken together saturated divalent aliphatic hydrocarbon chains which together with the nitrogen atom form a five- to six-sided heterocycle, and $R^5$ and $R^6$ are members of the class consisting of hydrogen, alkyl groups of not over eight carbon atoms, and phenyl groups.

2. A process for preparing N-substituted pyrroles which comprises reacting together between about 20° and 150° C. in liquid phase under the influence of an acidic catalyst giving in water at least the acidity of propionic acid a primary amine having an ionization constant of at least $4.6 \times 10^{-10}$ and 1,4-bis(dimethylamino)-1,3-butadiene.

3. A process for preparing N-alkyl pyrroles which comprises reacting under the influence of an acidic catalyst in liquid phase between 20° and 100° C. an alkylamine and 1,4-bis(dimethylamino)-1,3-butadiene, said catalyst giving in water at least the acidity of propionic acid.

4. A process for preparing N-substituted pyrroles which comprises reacting together under the influence of an acidic catalyst in liquid phase between 20° and 100° C. 1,4-bis(dimethylamino)-1,3-butadiene and a primary amine of the formula

wherein $X$ is an integer from 2 to 3 and A is a saturated divalent aliphatic chain which together with the nitrogen forms a six-sided heterocyclic monoamine, said catalyst giving in water at least the acidity of propionic acid.

5. A process for preparing N-substituted pyrroles which comprises reacting together under the influence of an acidic catalyst in liquid phase between 20° and 100° C. 1,4-bis(dimethylamino)-1,3-butadiene and a primary amine of the formula

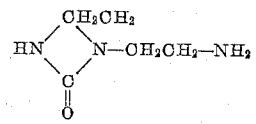

said catalyst giving in water at least the acidity of propionic acid.

6. A process for preparing N-substituted pyrroles which comprises reacting together under the influence of an acidic catalyst in liquid phase between 20° and 100° C. 1,4-bis(dimethylamino)-1,3-butadiene and a primary amine of the formula

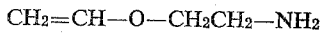

said catalyst giving in water at least the acidity of propionic acid.

7. A process for preparing N-substituted pyrroles which comprises reacting together under the influence of an acidic catalyst in liquid phase between 20° and 100° C. 1,4-bis(dimethylamino)-1,3-butadiene and a primary amine of the formula

said catalyst giving in water at least the acidity of propionic acid.

8. Pyrroles of the formula

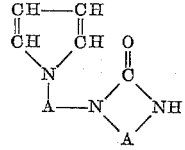

wherein A is an alkylene chain of two to three carbon atoms.

9. The compound

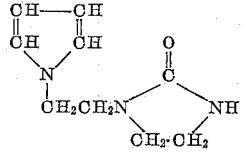

References Cited in the file of this patent

UNITED STATES PATENTS 2,617,827    McKeever et al. _____ Nov. 11, 1952

OTHER REFERENCES

Eisleb: Chem. Abst., vol. 36, col. 5466 (1942).